May 13, 1969 J. R. SMITH 3,444,391

ELECTRICAL CONTROL OF ROOM AIR CONDITIONERS

Filed Dec. 20, 1967

INVENTOR.
JAMES R. SMITH
BY
TENNES I. ERSTAD
JOHN E. McRAE

United States Patent Office 3,444,391
Patented May 13, 1969

3,444,391
ELECTRICAL CONTROL OF ROOM
AIR CONDITIONERS
James Ray Smith, Forest Park, Ohio, assignor to American Standard Inc., New York, N.Y., a corporation of Delaware
Filed Dec. 20, 1967, Ser. No. 692,063
Int. Cl. H01h 7/00, 43/00
U.S. Cl. 307—141                                    7 Claims

ABSTRACT OF THE DISCLOSURE

This invention proposes a control for room air conditioners which causes all conditioners in the system to be turned off at the end of a normal day (e.g. 5 p.m.), which permits any selected conditioner to be manually turned on during the early evening hours (e.g. 5 p.m. until midnight), which causes all conditioners to be automatically turned off at a predetermined night hour (e.g. midnight), and which causes all conditioners to be automatically turned on at the start of a normal day (e.g. 7 a.m.).

The control includes a turn-on relay for each conditioner, and two separate energizer lines for each relay. One energizer line includes a manual switch for actuation during the early evening hours. The other energizer line includes two time delay relays arranged to operate only at the start of a normal day.

BACKGROUND

Certain buildings, particularly office buildings are fully occupied during daylight hours (8 a.m. to 5 p.m.) but are substantially empty during night time hours (5 p.m. to 7 a.m. the next day). To save costs it is desirable that all room conditioners in these buildings go off at 5 p.m. and turn on again at 7 a.m. the next day. However, it is also desirable that each tenant in his particular office have the option of turning his own conditioner on should he desire to work late, for example until 10 p.m. The control systems schematically shown in the attached drawings are intended to attain these objectives.

THE DRAWINGS

FIG. 1 IN DETAIL

Figure 1:
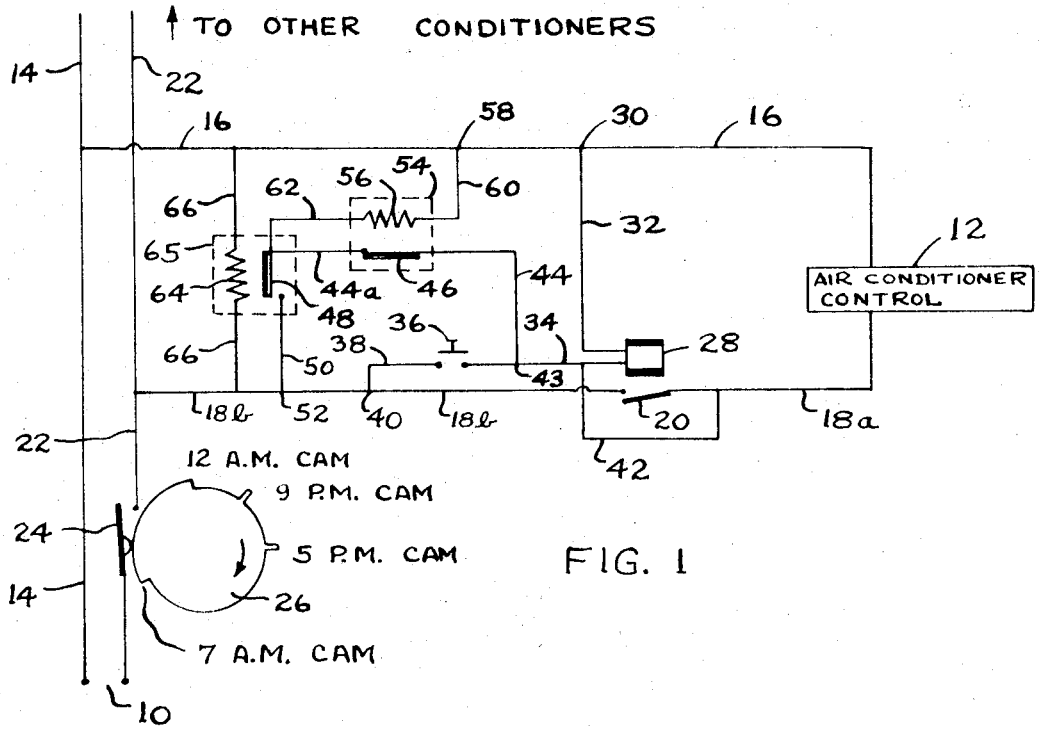
FIG. 1 is a diagram of a control system embodying the invention.

There is shown an electrical control comprising a central power source 10 located for example in the basement of an office building. Individual rooms of the building are equipped with electrically energized room conditioners, which may be of any desired type. For example each conditioner may consist of a finned heat exchange coil adapted to have hot or cold water flow therethrough from a central boiler or chiller; a motorized or solenoid valve controls the water flow, and a motor driven fan may be used to blow air across the fins into the room being conditioned. Alternately each room conditioner may consist of a self-contained refrigeration unit including compressor, condenser and evaporator, plus appropriate air-moving fans. Whatever the construction of each conditioner, it can be turned on and off by supplying or not supplying power to its individual control circuitry; the circuitry for one conditioner is referenced by numeral 12 in the drawings. An actual installation might involve one hundred or more individual air conditioners, each having a control 12.

Each control 12 is energized through a circuit comprising main power line 14, branch line 16, control 12, branch line 18a, switch arm 20, branch line 18b, main power line 22, and switch 24.

Switch 24 may be controlled manually, but as schematically shown in FIG. 1 it is controlled by a clock-driven timer disc 26 having suitable lobes for keeping the switch open at specified times during the night. As shown, the switch is continuously open from 12 a.m. to 7 a.m., and is momentarily open at 5 p.m. and at 9 p.m. The switch is closed during the period between 7 a.m. and 12 a.m., except for the temporary interruptions. Switch 24 and its operator would be located at a central location, as in the basement of the building being conditioned. The other illustrated circuitry (and duplicates thereof) would be located in the housing of the room conditioner.

Referring to switch 20, said switch is carried by the armature of a relay having a solenoid winding 28. Assuming switch 24 is closed, the winding may be energized through a first energizer line traced through power line 14, branch 16, junction 30, line 32, the winding, line 34, manual momentary make switch 36, line 38, junction 40, line 18b, power line 22 and switch 24. Upon initial closing of switch 36 the coil is energized to close switch 20, thus enabling the air conditioner to turn on at 12. Release of manual pressure on switch 36 does not de-energize winding 28; instead the winding remains energized via a holding circuit line 42.

Winding 28 may be energized through a second energizer line which traces through power line 14, branch line 16, junction 30, line 32, the winding, line 34, junction 43, line 44, bimetal switch 46, line 44a, bimetal 48, line 50, junction 52, line 18b, power line 22 and switch 24. Bimetal 48 forms part of a conventional time delay switch 54 which includes a bimetal resistance heater 56 arranged to open the bimetal switch after a predetermined time, as for example fifteen seconds.

Energization of heater 56 is through a circuit which traces through line 16, junction 58, line 60, the heater, line 62, bimetal 48, line 50 and line 18b. Heater 56 cannot be energized until bimetal 48 has been sufficiently heated by its heater 64; the necessary heating period may for example be twenty seconds or thereabouts and energization is accomplished through a circuit line 66. Heater 64 and bimetal 48 form a time delay relay 65.

MORNING START-UP

Just prior to start-up the circuit is as shown in the drawing. To accomplish morning start-up of all units at for example 7 a.m. switch 24 is closed, as by registry of the main cam disc depression with the switch actuator. Initially only heater 64 is energized to warp bimetal 48 to circuit closed condition. This permits winding 28 to be energized via the two bimetals 46 and 48. Heater 56 turns on as soon as bimetal 48 closes, but switch 46 does not immediately open; instead there is a delay period of a few seconds during which coil 28 is energized. The coil is held on by line 42 and switch 20 even after bimetal 46 opens.

AFTERNOON SHUT-DOWN

To accomplish 5 p.m. shut-down of all units switch 24 is held open for one or two seconds, as by the 5 p.m. cam on disc 26. During this interval coil 28 is de-energized, but bimetals 48 and 46 cool only slightly and they remain as they were; i.e. bimetal 48 remains closed and bimetal 46 remains open. All air conditioners turn off because each switch 20 is open.

EVENING TURN-ON

Should a particular tenant wish to turn on his conditioner at any time between 5 p.m. and 12 midnight he depresses switch 36, thus causing coil 28 to be energized via line 38. Switch 20 closes to turn on the conditioner. When switch 36 is released coil 28 continues to remain energized via line 42.

NINE P.M. TURN-OFF

The momentary current interruption caused by the nine p.m. cam (switch 24) serves to de-energize coil 28, thus opening switch 20 and turning off the conditioner. If the tenant is still in his office and so wishes he can again turn on the conditioner by depressing switch 36.

MIDNIGHT TURN-OFF

When the main cam lobe arrives at the switch actuator (12 midnight) power to all units is interrupted. Therefore none of the conditioners can be turned on during the midnight to 7 a.m. period; bimetals 48 and 46 cool down to assume their illustrated positions. At 7 a.m. switch 24 closes to repeat the sequence previously described.

In the illustrated system all power is off between 12 midnight and 7 a.m. However it would be feasible to provide short power interruptions at midnight and to continue supplying power during the midnight-7 a.m. period, as in the previously described 5 p.m. to 12 a.m. period. In any event, at the end of the night cycle (7 a.m.) there should have been a prolonged main power interruption to return bimetals 46 and 48 to their illustrated positions. Assuming the bimetals each require about twenty seconds to cool and return to their illustrated positions, the prolonged power interruption should be on the order of one minute or more. This resets the time delays 65 and 54 so they can restart all of the units in the system when the power is restored at 7 a.m. As previously noted, delays 65 and 54 are intended to come into play only during the automatic morning start-up; they then provide a momentary energizing circuit for coil 28. At other periods they are ineffective to energize coil 28.

FIGURE 2 IN DETAIL

Figure 2:
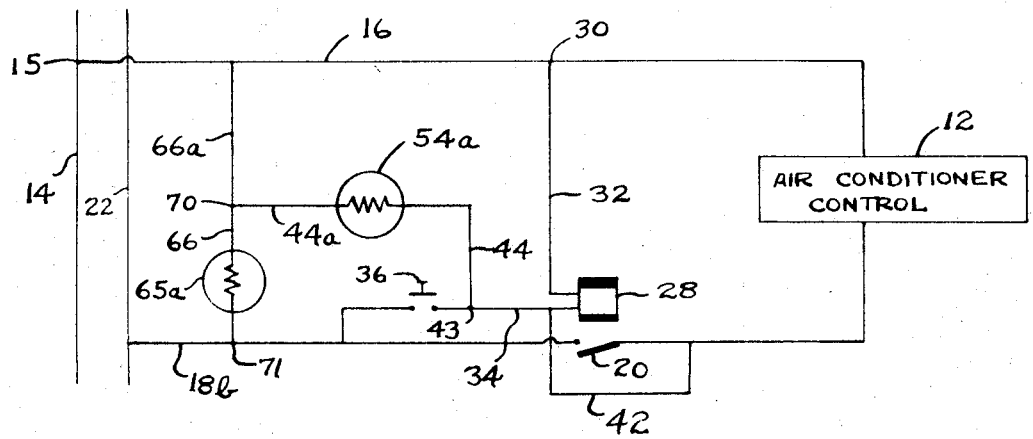
FIG. 2 is a diagram of a second control system embodying the invention.

This circuitry is an alternate to that of FIG. 1 and may be controlled by a central timer similar to that shown a 24, 26. FIG. 2 uses thermistors 54a and 65a in lieu of bimetal relays 54 and 65. Thermistor 65a is chosen to have a negative temperature coefficient of resistance, and thermistor 54a is chosen to have a positive temperaure coefficient of resistance. When power is first supplied (7 a.m.) thermistor 65a starts to self-heat through the energization provided by line 66a; thermistor 54a does not at this time begin to self-heat since it does not yet have an energizing circuit. After a short period the resistance at 65a is lowered so that an energizing circuit for thermistor 54a is established through line 14, junction 15, line 16, junction 30, line 32, coil 28, line 34, junction 43, line 44, thermistor 54a, line 44a, junction 70, line 66, thermistor 65a, junction 71, line 18b, and line 22; this circuit only exists after thermistor 65a has been heated sufficiently to have its resistance lowered to the desired value.

At the time thermistor 54a begins to be self-heated its resistance is low enough so that sufficient current flows therethrough to energize coil 28, thus turning on the conditioner. As the heating of thermistor 54a continues its resistance increases so that it no longer carries enough current to hold in coil 28. However by this time the coil is energized through line 42.

It will be seen that functionally thermistor 65a operates like normally open bimetal switch 48, and thermistor 46 operates like normally closed bimetal switch 46.

The start-up and shut-down sequences of the FIG. 1 and FIG. 2 circuits are thus similar.

I claim:
1. In combination: a central power source; a multiplicity of electrically controlled room air conditioners arranged to receive electrical power from said source; central switch means for (1) temporarily interrupting the supply of power to all of the air conditioners for a relatively short period of time at the end of a normal day, for (2) temporarily interrupting the supply of power to all of the air conditioners for a relatively short period of time during early evening hours, and for (3) interrupting the supply of power to all of the air conditioners for a relatively long period of time during the interval just prior to start-up the next day; a relay in each conditioner for controlling the power supplied to that conditioner; means for energizing each respective relay comprising two separate energizer lines, one of said energizer lines including a manually operable switch momentarily effective at any time to put the relay in a conditioner-powered condition, the other energizer line comprising first and second separate time delay switches, said first time delay switch being a normally open switch and the seiond time delay switch being a normally closed switch, the time delay constants for said first and second switches being less than the aforementioned relatively long period but greater than the aforementioned relatively short period; said time delay switches being connected with one another so that closure of the central switch means first energizers the normally open time delay switch, whereupon that switch moves to the closed position to energize the normally closed switch; said other energizer line being effective to energize the relay only while both time delay switches are closed.

2. The combination of claim 1 wherein each time delay switch comprises a switch-actuation bimetal and a bimeteal heater; the bimetals being a series with one another and with the relay.

3. The combination of claim 2 wherein the bimetal for the normally open time delay is in series with the heater for the normally closed time delay, whereby said heater can be energized only when said bimetal is in the circuit-closed position.

4. The combination of claim 3 wherein the bimetal for the normally closed time delay is in parallel with its heater, whereby said last mentioned heater remains energized after said last mentioned bimetal has moved to the circuit-open position.

5. The combination of claim 1 wherein the first time delay switch is a thermistor having a negative temperature coefficient of resistance, and the second time delay switch is a thermistor having a positive temperature coefficient of resistance.

6. The combination of claim 5 wherein the thermistors are in series with one another and with the relay.

7. The combination of claim 5 and further comprising a circuit for energizing the negative temperature coefficient thermistor while the other thermistor is in the substantially non-conducting state.

References Cited

UNITED STATES PATENTS 3,037,364   6/1962   Tucker et al. _____ 62—158
3,054,271   9/1962   McGrath et al. __ 317—141 X ROBERT K. SCHAEFER, *Primary Examiner.*

T. B. JOIKE, *Assistant Examiner.*

U.S. Cl. X.R.

62—158, 231; 317—141